US012143978B2

(12) United States Patent
Kim et al.

(10) Patent No.: US 12,143,978 B2
(45) Date of Patent: Nov. 12, 2024

(54) PDCCH ENHANCEMENT FOR GROUP PAGING

(71) Applicant: Apple Inc., Cupertino, CA (US)

(72) Inventors: Yuchul Kim, Santa Clara, CA (US); Fangli Xu, Beijing (CN); Sarma V Vangala, Campbell, CA (US); Sethuraman Gurumoorthy, San Jose, CA (US); Yuqin Chen, Shenzhen (CN); Murtaza A Shikari, Mountain View, CA (US); Zhibin Wu, Los Altos, CA (US); Haitong Sun, Irvine, CA (US); Yushu Zhang, Beijing (CN); Wei Zeng, San Diego, CA (US); Dawei Zhang, Saratoga, CA (US); Haijing Hu, Beijing (CN); Hong He, Cupertino, CA (US); Weidong Yang, San Diego, CA (US); Oghenekome Oteri, San Diego, CA (US); Chunxuan Ye, San Diego, CA (US); Chunhai Yao, Beijing (CN); Jie Cui, San Jose, CA (US); Yang Tang, Cupertino, CA (US); Srirang A Lovlekar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 324 days.

(21) Appl. No.: 17/439,094

(22) PCT Filed: Feb. 12, 2020

(86) PCT No.: PCT/CN2020/074913
§ 371 (c)(1),
(2) Date: Sep. 14, 2021

(87) PCT Pub. No.: WO2021/159323
PCT Pub. Date: Aug. 19, 2021

(65) Prior Publication Data
US 2022/0159669 A1    May 19, 2022

(51) Int. Cl.
*H04W 72/121* (2023.01)
*H04W 68/02* (2009.01)
(Continued)

(52) U.S. Cl.
CPC ......... *H04W 72/121* (2013.01); *H04W 68/02* (2013.01); *H04W 72/1273* (2013.01); *H04W 72/23* (2023.01)

(58) Field of Classification Search
CPC ............... H04W 72/121; H04W 68/02; H04W 72/1273; H04W 72/23; H04W 68/025; H04W 52/0229; Y02D 30/70
See application file for complete search history.

(56) References Cited

U.S. PATENT DOCUMENTS

2015/0092676 A1* 4/2015 Periyalwar ............ H04W 76/15
370/329
2018/0368103 A1* 12/2018 Zhou ...................... H04W 68/02
2022/0279479 A1   9/2022 Nader

FOREIGN PATENT DOCUMENTS

CN   101843153 A   9/2010
CN   103378939 A   10/2013
(Continued)

OTHER PUBLICATIONS

3GPP TSG RAN WG1 Meeting #95, Title: UE power saving for paging, Source: Huwaei, HiSilicon, Nov. 12-16, 2018 (Year: 2018).*

(Continued)

*Primary Examiner* — Marisol Figueroa
(74) *Attorney, Agent, or Firm* — Kowert, Hood, Munyon, Rankin & Goetzel, P.C.

(57) ABSTRACT

Apparatuses, systems, and methods for PDCCH enhancements for group-based paging indications. A user equipment device may be configured to receive, from a network, an indication of a paging occasion via a PG-RNTI and/or via at (Continued)

least 6 bits of a DCI. A value of the PG-RNTI may be associated with the paging occasion as well as a set of UEs, including the UE. The UE may be configured to monitor the paging occasion based on the value of the PG-RNTI and receive, during the paging occasion, a paging indication via at least six bits of a DCI, where each bit of the at least six bits may indicate a paging indication for a particular set of UEs and the particular set of UEs may be a subset of the set of UEs. The UE may also be configured to, in response to determining that the UE has a paging message, decode a corresponding PDSCH.

20 Claims, 16 Drawing Sheets

(51) Int. Cl.
*H04W 72/1273* (2023.01)
*H04W 72/23* (2023.01)

(56) References Cited

FOREIGN PATENT DOCUMENTS

| JP | 2010538584 | 12/2010 | | |
|---|---|---|---|---|
| JP | 2011503970 | 1/2011 | | |
| WO | WO-2013003980 A1 * | 1/2013 | ........ | H04W 56/0005 |
| WO | 2017079574 | 5/2017 | | |
| WO | WO-2017076624 A1 * | 5/2017 | ............ | H04W 68/02 |
| WO | 2018201499 A1 | 11/2018 | | |
| WO | 2019096035 A1 | 5/2019 | | |
| WO | 2020024278 | 6/2020 | | |
| WO | 2021118439 | 6/2021 | | |

OTHER PUBLICATIONS

1 First Examination Report for Indian Patent Application No. 202217028645; Mar. 31, 2023.
International Search Report for PCT Patent Application No. PCT/CN2020/074913; mailed Nov. 17, 2020.
Huawei et al. "Finaliation of NR Paging" 3GPP TSG RAN WG1 Meeting #91 R1-1719373; Dec. 1, 2017.
Extended European Search Report for EP Patent Application No. 20919339.0; 15 pages; Oct. 7, 2022.
Samsung "NB M2M—Discussion on paging procedure"; 3GPP GERAN2 Meeting #66 GP-150382; Vilnius, Lithuania; 4 pages; May 25, 2015.
Ericsson "[E129] Resolving FFS on paging information provided in the paging DCI"; 3GPP TSG RAN Wg2 AH-1807 R2-1809616; Montreal, Canada; 3 pages; Jul. 2, 2018.
Office Action for JP Patent Application No. 2022-531571; Jun. 7, 2023.
Huawei et al. "UE power saving for paging"; 3GPP TSG RAN WG1 Meeting #96 R1-1903192; Feb. 2019.

* cited by examiner

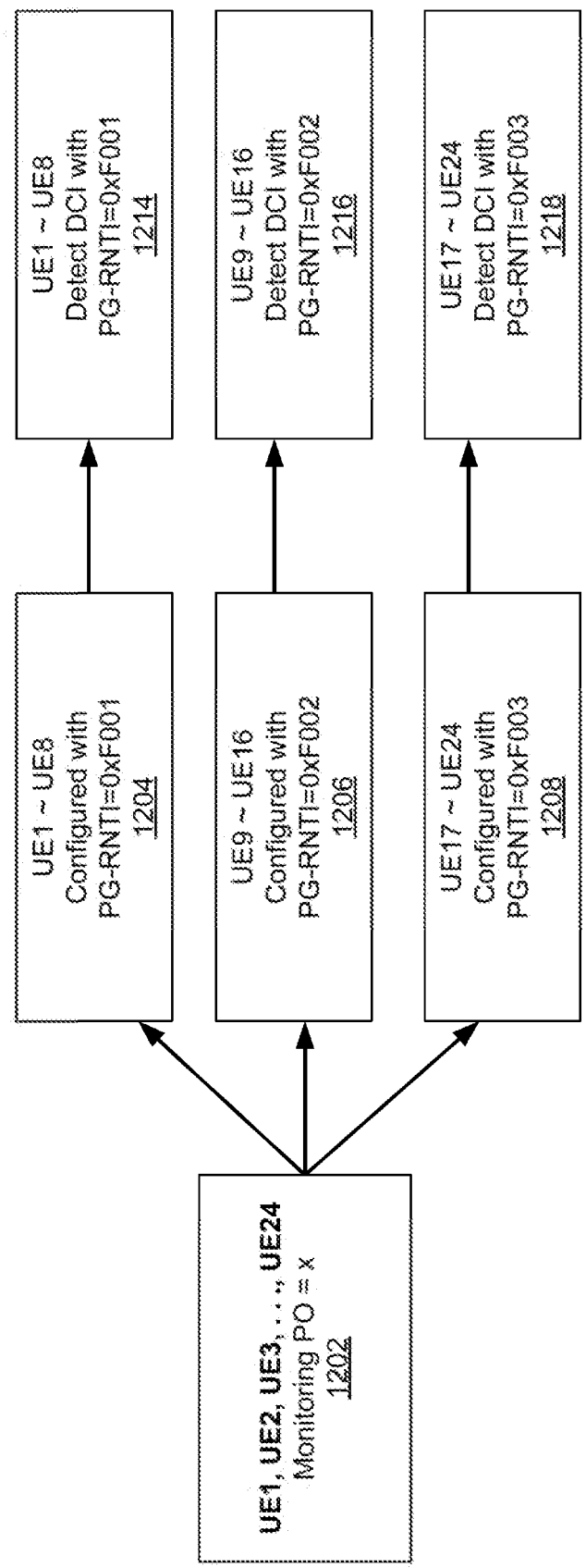

PDCCH ENHANCEMENT FOR GROUP PAGING

PRIORITY CLAIM INFORMATION

This application is a national stage application of International Application No. PCT/CN2020/074913, filed on Feb. 12, 2020, titled "PDCCH Enhancement for Group Paging", which is hereby incorporated by reference in its entirety.

FIELD

The present application relates to wireless devices, and more particularly to apparatuses, systems, and methods for physical downlink control channel (PDCCH) enhancements for group-based paging indications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

SUMMARY

Embodiments relate to apparatuses, systems, and methods for physical downlink control channel (PDCCH) enhancements for group-based paging indications, e.g., by reducing a number of wireless devices monitoring a paging opportunity, thereby reducing a probability that a wireless device unnecessarily decodes a physical downlink shared channel for paging.

In some embodiments, a wireless device, e.g., such as a user equipment device (UE), may be configured to receive, from a network, a group indication via at least six bits of a downlink control index (DCI). In some embodiments, each bit of the at least six bits indicates a paging indication for a particular set of UEs. The UE may be configured to determine, based on the group indication, whether the UE has a paging message and, in response to determining that the UE has a paging message, decode a corresponding physical downlink shared channel (PDSCH)

In some embodiments, the UE may be configured to receive, from a network, a group indication via a paging radio network temporary identifier (PG-RNTI). In some embodiments, a value of the PG-RNTI may be associated with a paging occasion and the value of the PG-RNTI may be associated with a set of devices, including the UE. The UE may be configured determine, based on the value of the PG-RNTI, whether the UE has a paging message and, in response to determining that the UE has a paging message, decode a corresponding PDSCH.

In some embodiments, the UE may be configured to receive, from a network, an indication of a paging occasion via a PG-RNTI. In some embodiments, a value of the PG-RNTI may be associated with the paging occasion and the value of the PG-RNTI may be associated with a set of UEs, including the UE. The UE may be configured to monitor the paging occasion based on the value of the PG-RNTI and receive, during the paging occasion, a paging indication via at least six bits of a DCI. In some embodiments, each bit of the at least six bits may indicate a paging indication for a particular set of UEs and the particular set of UEs may be a subset of the set of UEs. The UE may also be configured to, in response to determining that the UE has a paging message, decode a corresponding PDSCH.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 11 illustrates an example of a group indication using an unused bit field in DCI1_0, according to some embodiments.

FIG. 12 illustrates an example of using a PG-RNTI to support different UE groups for paging among UEs monitoring a paging opportunity, according to some embodiments.

DETAILED DESCRIPTION

Terms

Figure 1A:
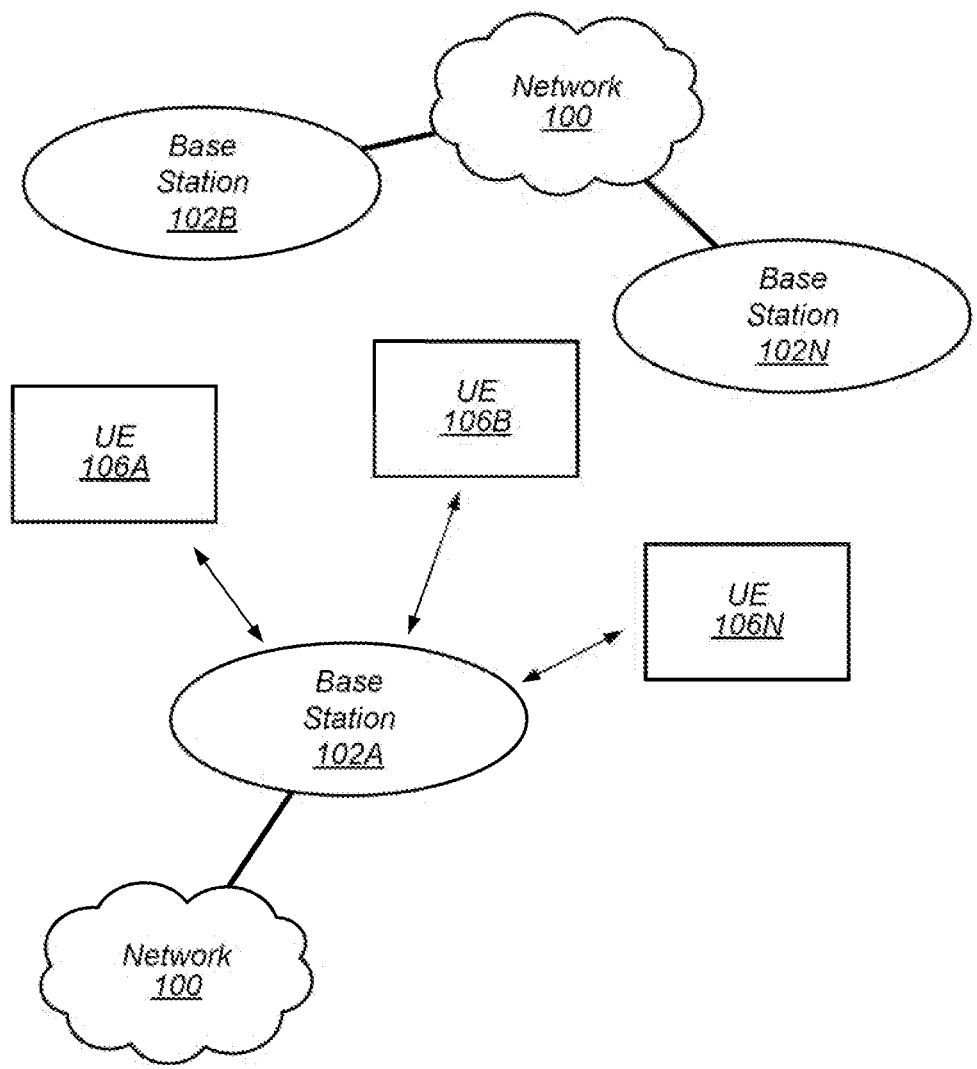
FIG. 1A illustrates an example wireless communication system according to some embodiments.

The following is a glossary of terms used in this disclosure:

Memory Medium—Any of various types of non-transitory memory devices or storage devices. The term "memory medium" is intended to include an installation medium, e.g., a CD-ROM, floppy disks or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™) laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors max be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
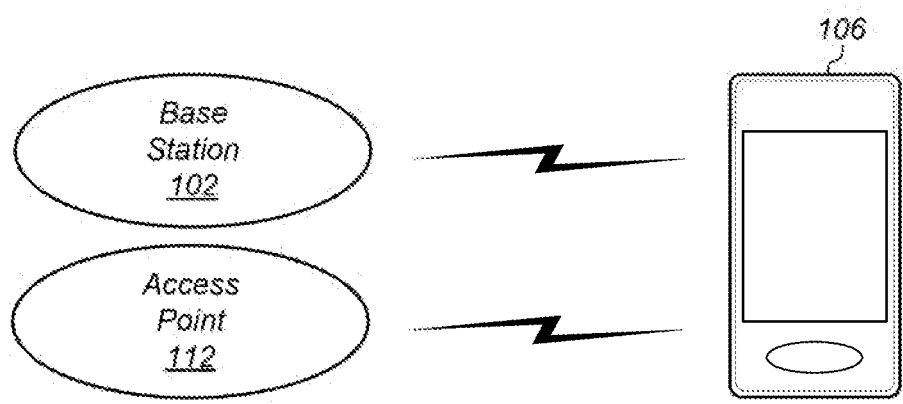
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that a the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD) etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a handheld device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
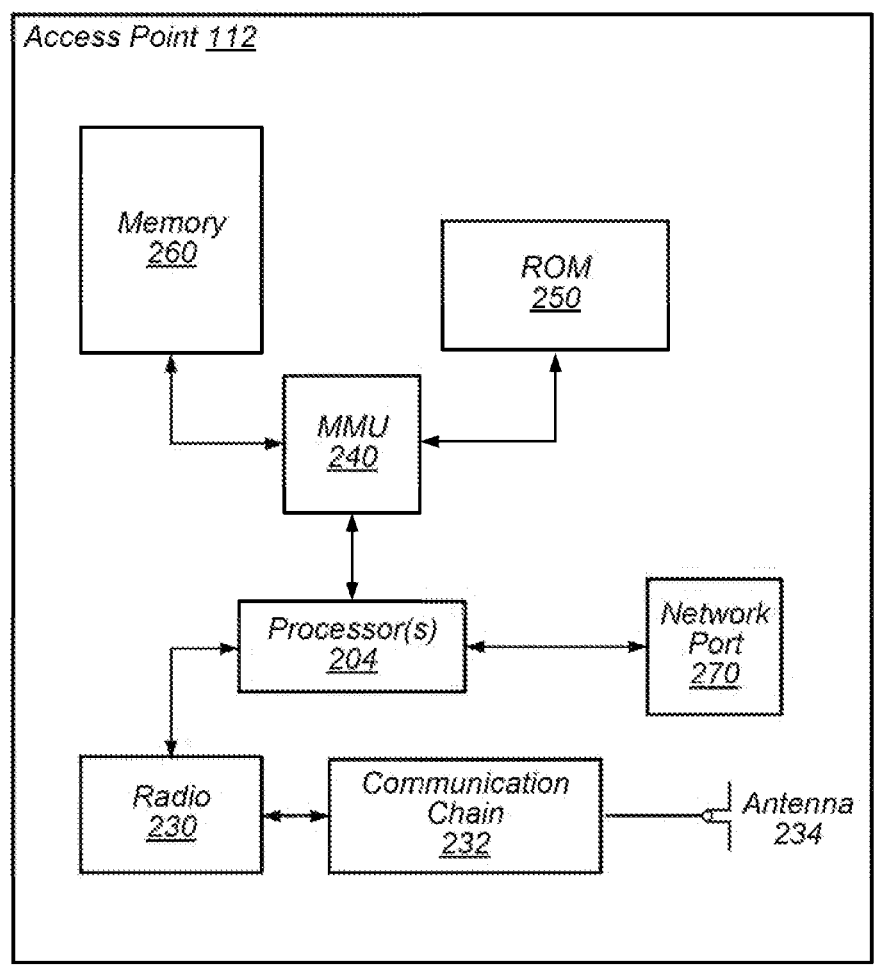
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for PDCCH enhancements for group-based paging indications as further described herein.

Figure 3:
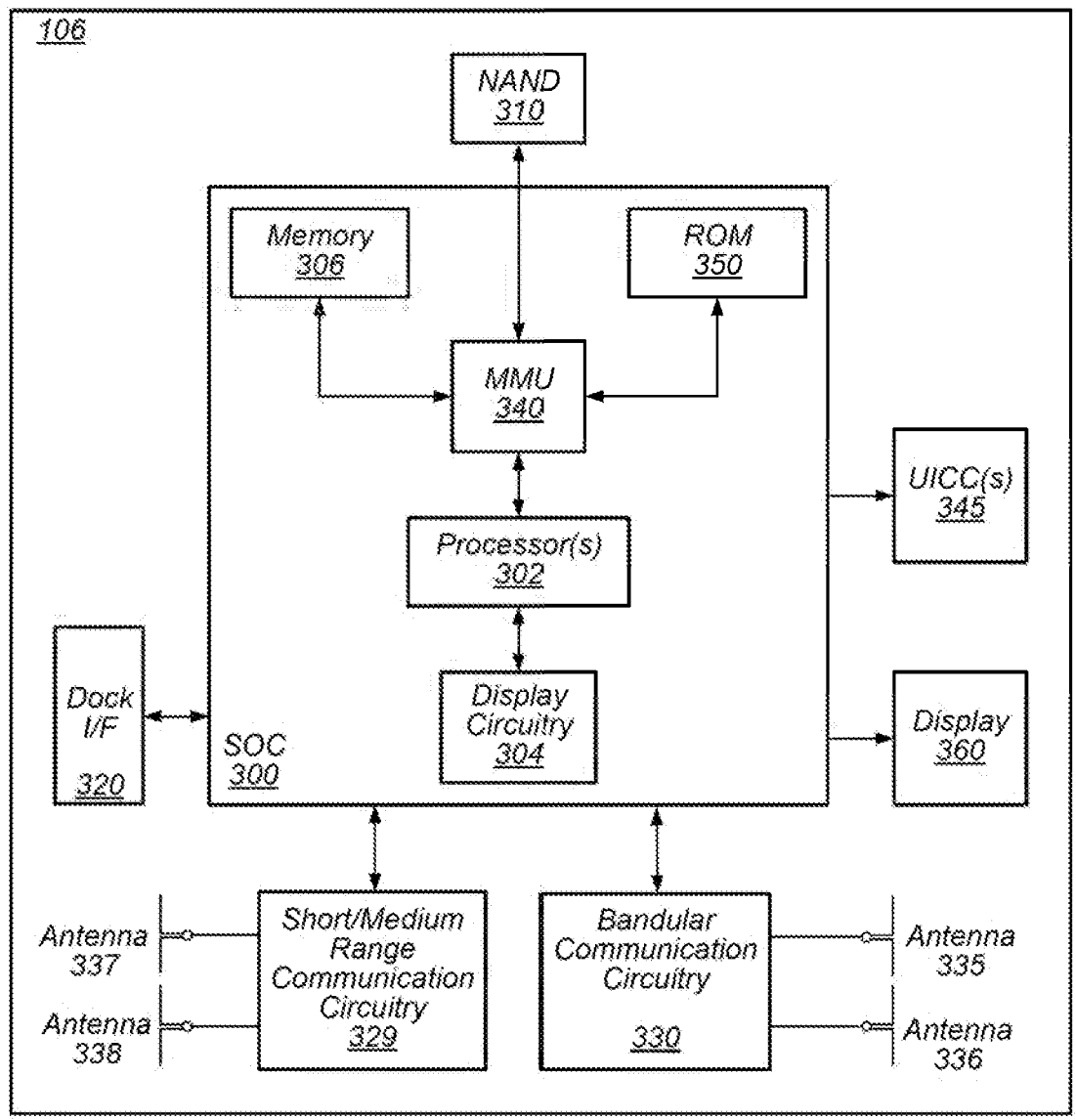
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information user and/or receiving or interpreting user input.

The communication device 106 may further include one or more smart cards 345 that include SIM (Subscriber identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340 which may be configured to receive addresses from the processor(s) 302 and translate those addresses to locations in memory (e.g., memory 306, read only memory (ROM) 350, NAND flash memory 310 and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for PDCCH enhancements for group-based paging indications as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 mays be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
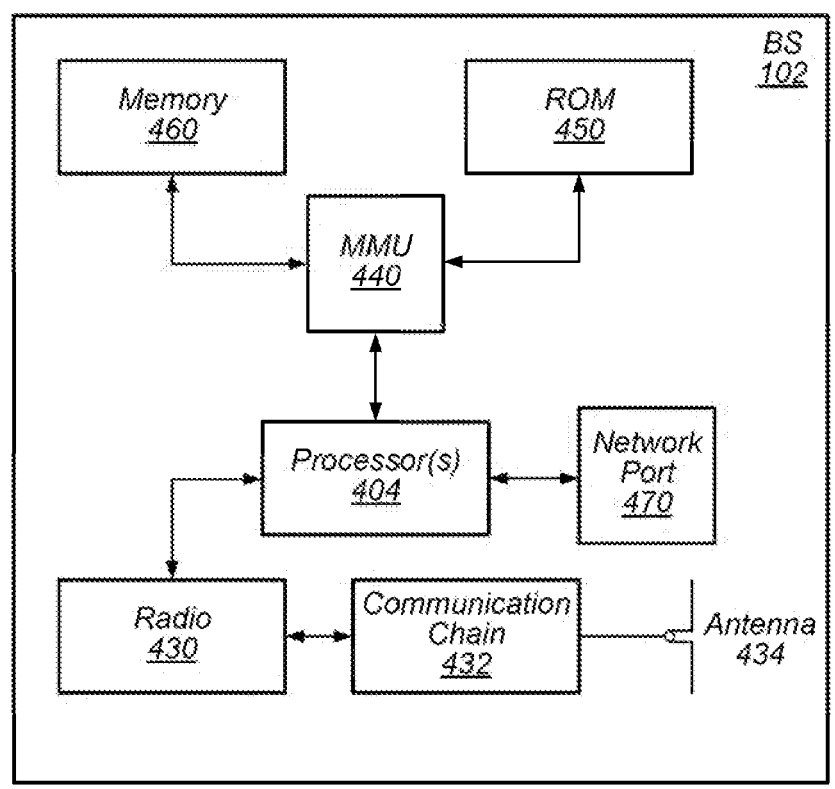
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000 Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
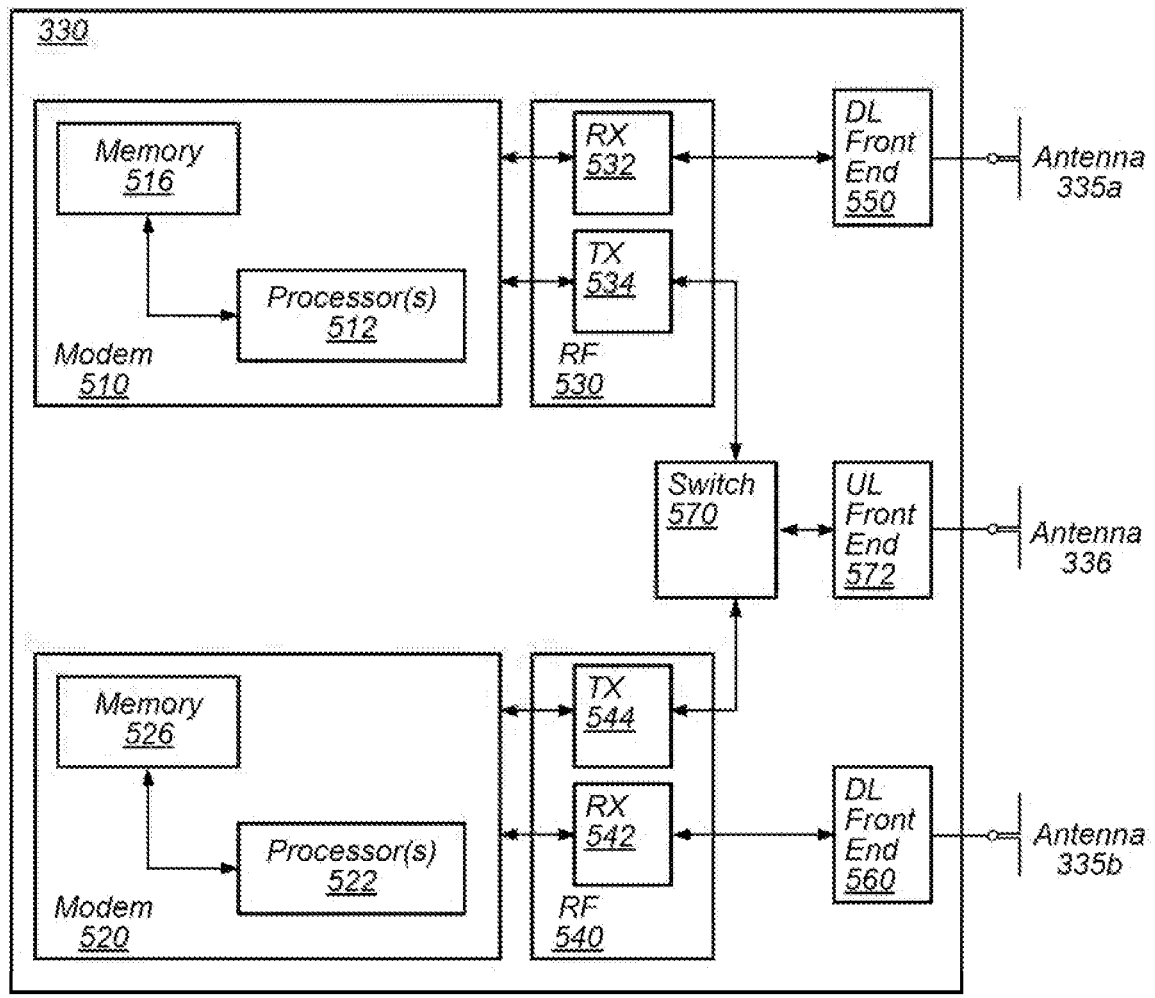
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for PDCCH enhancements for group-based paging indications as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
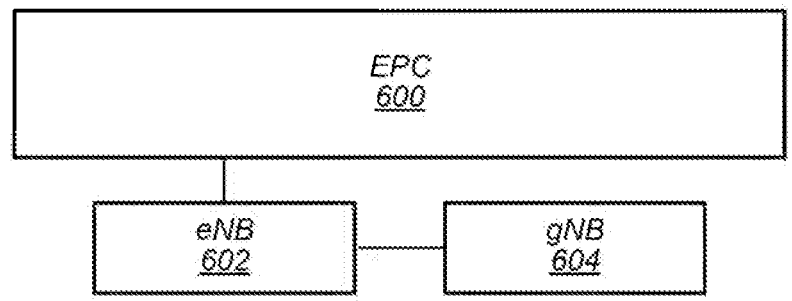
FIG. 6A illustrates an example of connections between an EPC network, an LTE base station (eNB), and a 5G NR base station (gNB).
Figure 6B:
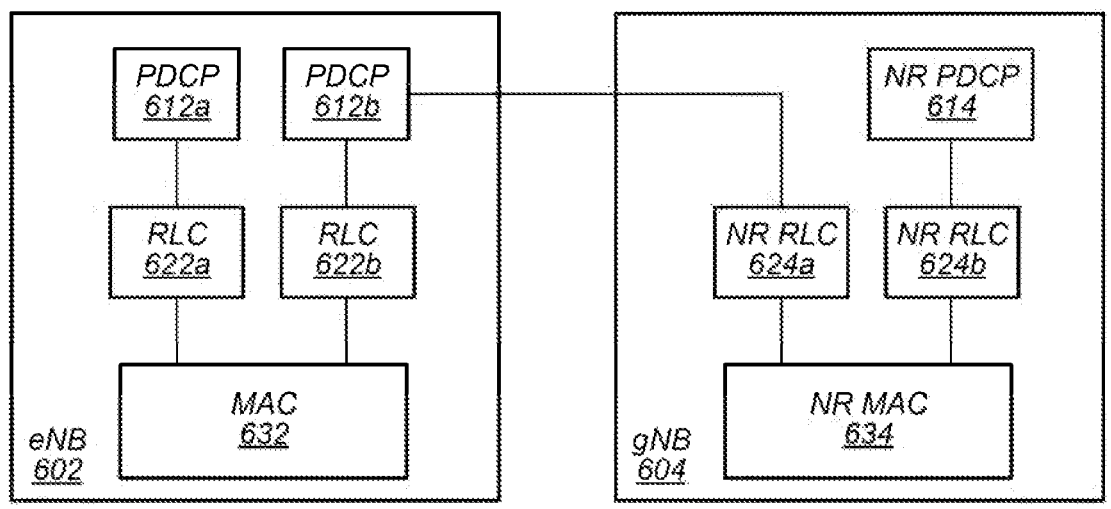
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a max interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture Interworking with Wi-Fi

Figure 7A:
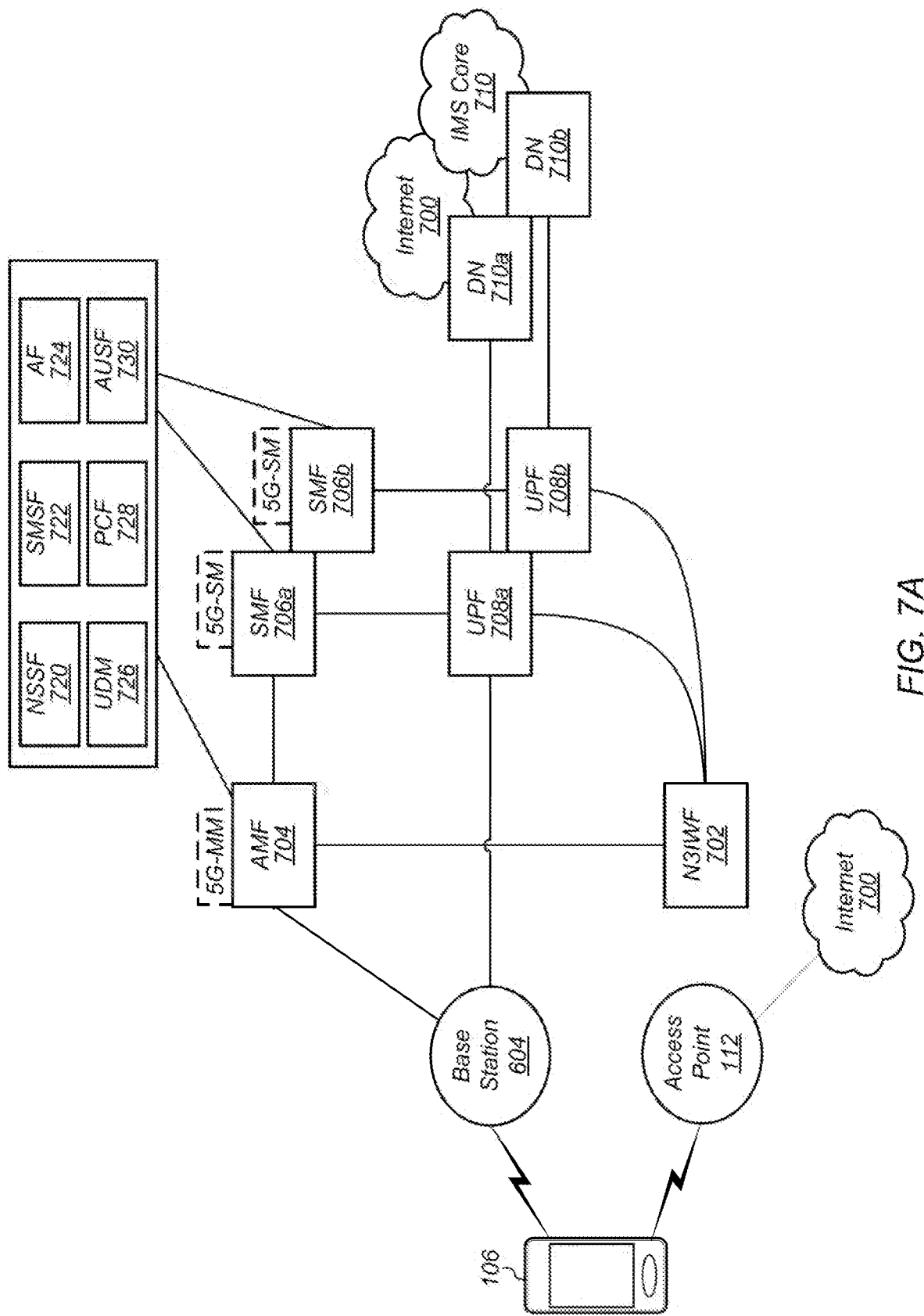
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
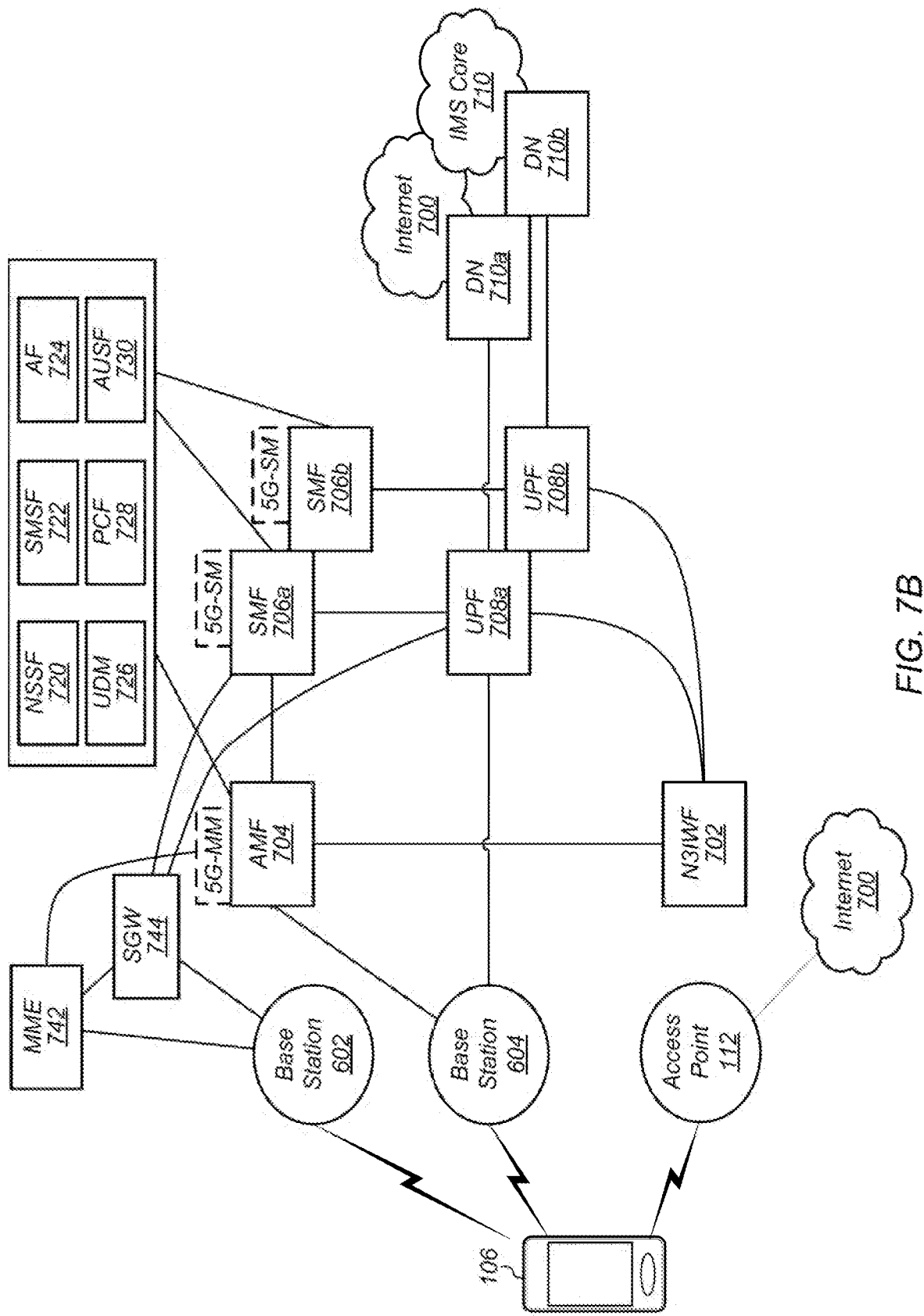
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured for PDCCH enhancements for group-based paging indications, e.g., as further described herein.

Figure 8:
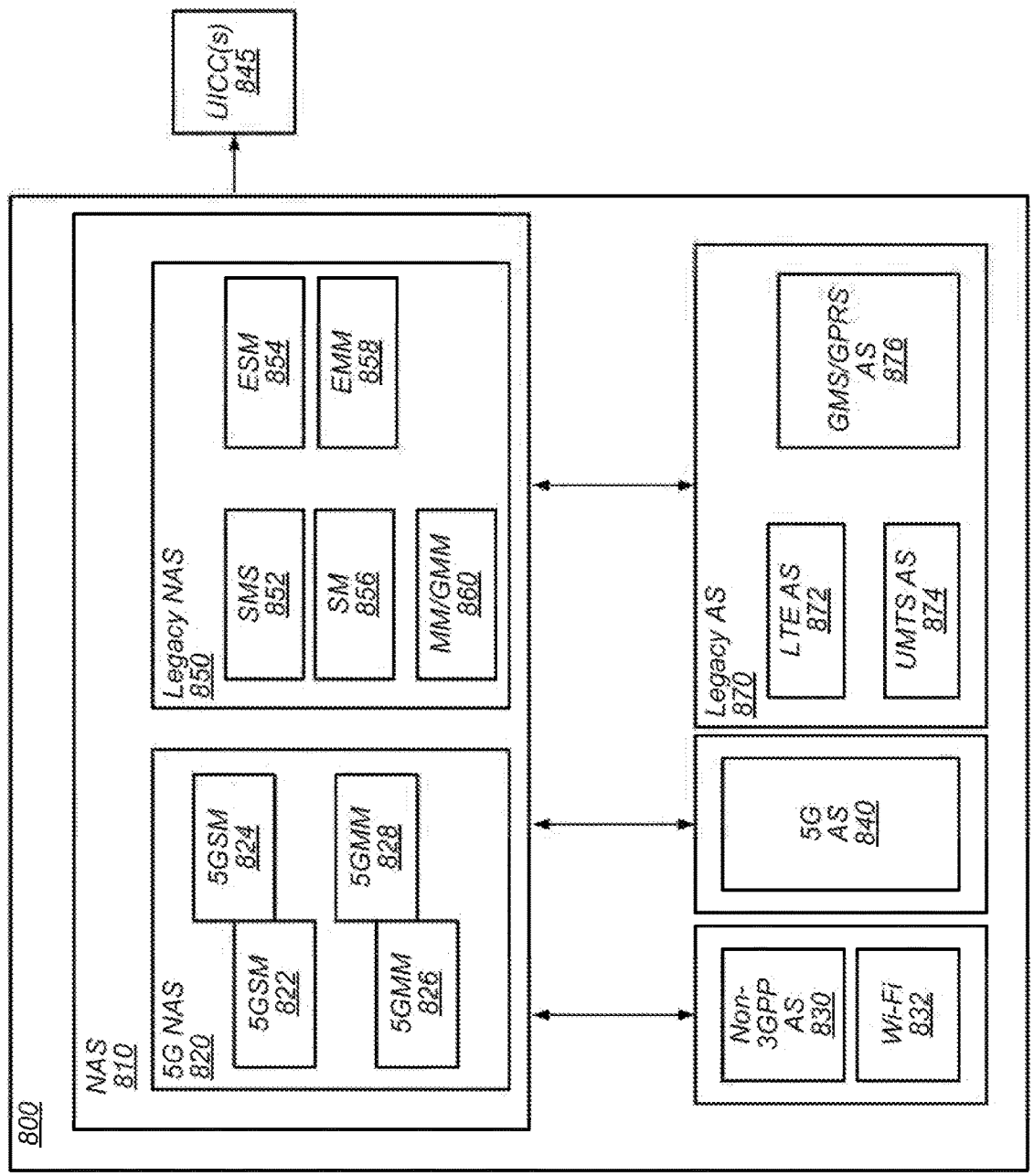
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/CPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLAIN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods for PDCCH enhancements for group-based paging indications, e.g., as farther described herein.

PDCCH Paging Enhancements

In current implementations, a paging procedure may be implemented to transmit as paging message to as wireless device (e.g., UE) in various radio resource control (RRC) states/modes, such as idle (e.g., RRC_IDLE), inactive (e.g., RRC_INACTIVE), and/or connected (e.g., RRC_CONNECTED). For example, for a wireless device in an inactive state, paging may be initiated from a radio access network (RAN), e.g., to switch the wireless device to a connected state. As another example, for a wireless device in an idle state, paging may be initiated by a core network (CN), e.g., to indicate call arrival and switch the wireless device to a connected state. As a further example, for a wireless device in a connected state, paging may be initiated from a RAN, e.g., to indicate a system information update. In some implementations, there may be multiple types of paging messages e.g., a message intended for a specific wireless device (e.g., UE specific paging) or a message intended for all wireless devices (e.g., general paging for all UEs). For example, a UE specific page may indicate call arrival whereas a general page for UEs may be a public warning system (PWS) message such as a commercial mobile alert system (CMAS) message, an earthquake and tsunami warning system (ETWS) message, or a system information (SI) update message.

In some implementations, an RRC state of the wireless device (UE) may influence how the wireless device monitors a PDCCH for a paging message. For example, when the wireless device is in an RRC connected state, the wireless device may monitor downlink control information format 1_0 (DCI1_0) with cycle redundancy check (CRC) scrambled with a paging radio network temporary identifier (P-RNTI) in a Type2-PDCCH common search space (CSS) set configured by a pagingSearchSpace parameter in a primary cell (PCell) of a master cell group (MCG). Thus, if the wireless device receives DCI1_0 with CRC scrambled with P-RNTI, it may decode an associated physical downlink shared channel (PDSCH) and deliver a medium access control (MAC) protocol data unit (PDU) to upper layers of the wireless device.

Figure 9:
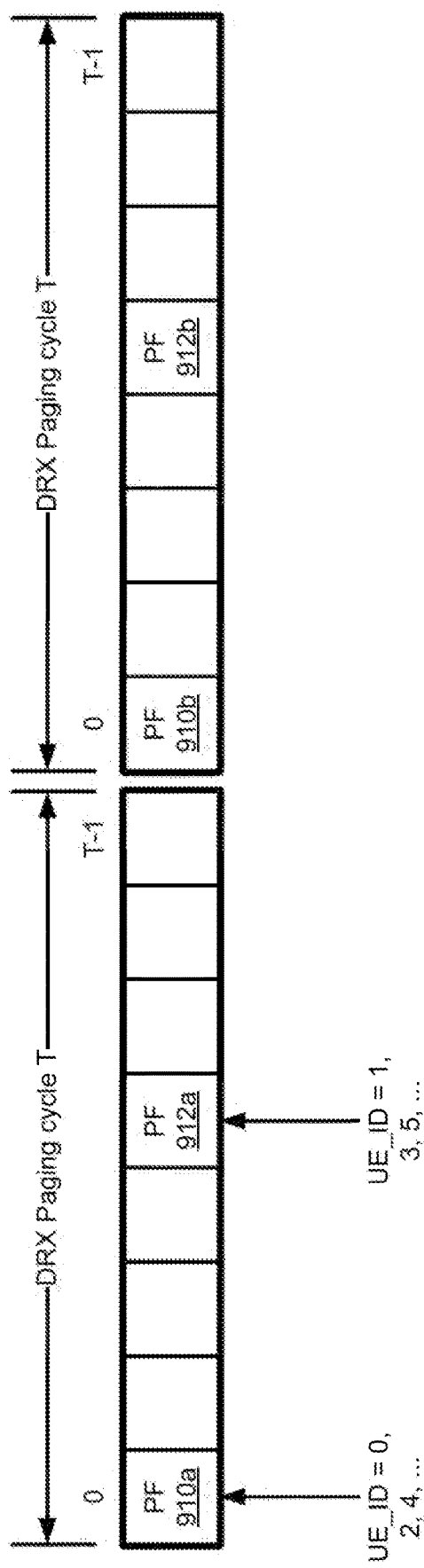
FIG. 9 illustrates an example of a paging frame occurring in a DRX paging cycle.

As another example, when the wireless device is in an RRC idle or inactive state, the wireless device may monitor one paging occasion (PO) per discontinuous reception (DRX) cycle. Note that a PO may be a set of physical downlink control channel (PDCCH) monitoring occasions and may consist of (and/or include) multiple time slots, e.g., multiple subframes and/or orthogonal frequency division multiplexing (OFDM) symbols. Additionally, a paging frame (PF) may be defined as one radio frame (e.g., 10 milliseconds) which may contain one or multiple paging occasions. As shown by FIG. 9, a wireless device may be assigned one paging frame per DRX paging cycle and a DRX paging cycle may include multiple paging frames (e.g., assigned to different sets of wireless devices). Thus, a PF 910*a-b* may be assigned to wireless devices with UE_IDs 0, 2, 4, and so forth whereas a PF 912*a-b* with UE_IDs 1, 3, 5, and so forth.

Figure 10:
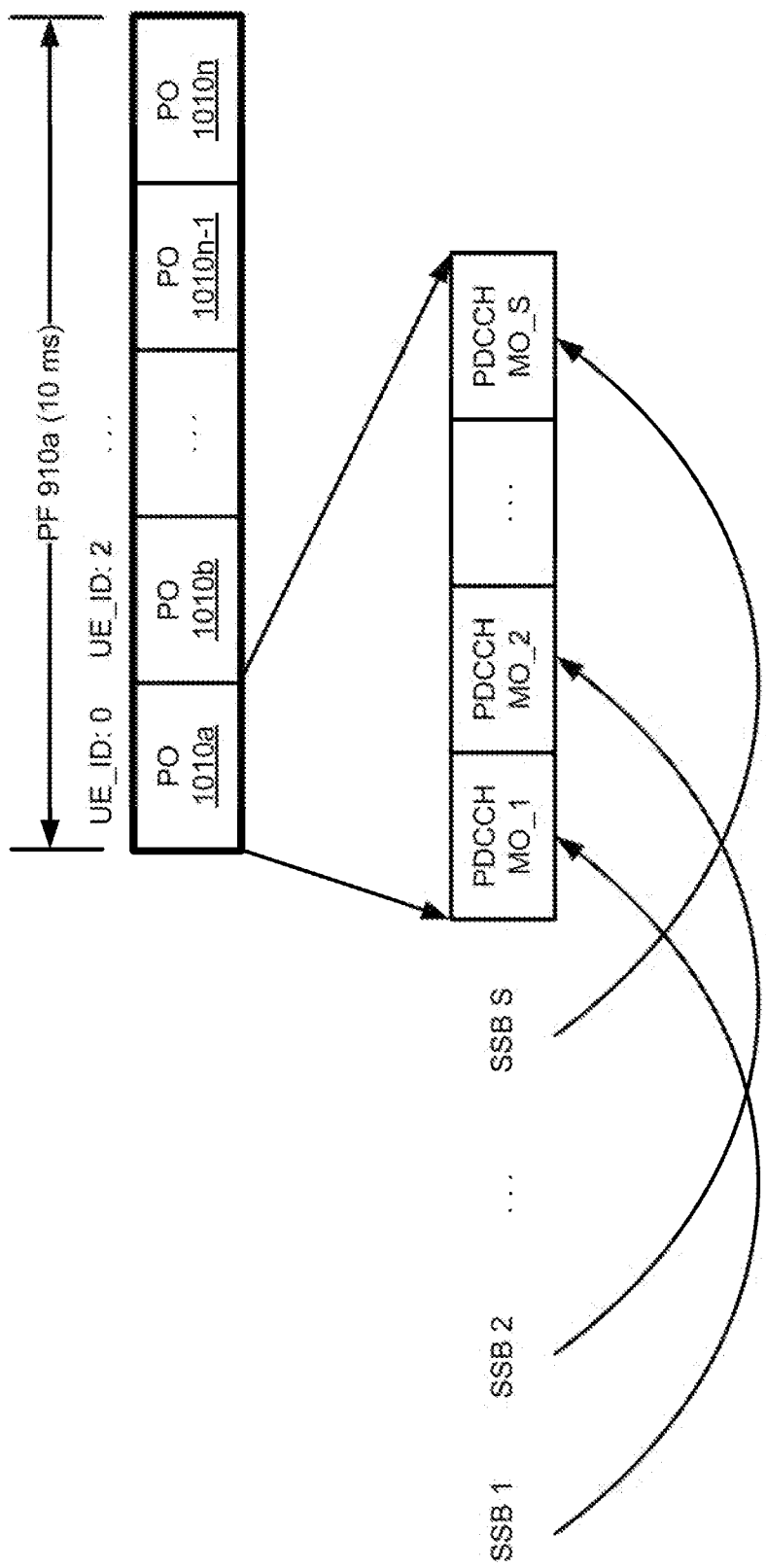
FIG. 10 illustrates an example of paging occasions occurring in a paging frame.

As illustrated by FIG. 10, a paging frame, such as PF 910*a*, may include multiple paging occasions 1010*a-n*. Additionally, a paging occasion, such as paging occasion 1010*a*, may be defined as a set of 'S' consecutive PDCCH monitoring occasions (e.g., PDCCH MO_1, PDCCH MO_2 to PDCCH MO_S) where 'S' is a number of actual transmitted synchronization signal blocks (SSBs) determined according to an ssb-PositionBurst parameter broadcasted in a SIB1 message. Thus, a paging occasion may consist of (or include) multiple slots as shown by FIG. 10. In some implementations, a K-th PDCCH monitoring occasion for paging in the paging occasion may correspond to a K-th transmitted SSB. Additionally, a single transmit beam may be used for both the page and the SSB. In some implementations, PDCCH monitoring occasions for paging which do not overlap with uplink symbols (e.g., as determined according to a tdd-UL-DLConfigurationCommon parameter) may be sequentially numbered from zero starting from the first PDCCH monitoring occasion for paging in the paging frame.

In some implementations, a PDCCH monitoring occasion may be defined as a sequence of OFDM symbols for monitoring PDCCH. The PDCCH monitoring occasion may be determined by pagingSearchSpace and firstPDCCH-MonitoringOccasionOfPO, if configured. Additionally, the pagingSearchSpace provided in PDCCH-ConfigCommon may indicate an identifier (ID) of a search space for paging. Further, if/when SearchSpaceID=0 is configured for pagingSearchSpace, PDCCH monitoring occasions for paging may be the same as for RMSI. In addition, if the number of paging occasions (Ns) is 1, then there may only be one paging occasion which starts from the first PDCCH monitoring occasion for paging in the paging frame. However, if the number of paging occasions is 2, then the paging occasion is either in a first half of the paging frame (i_s=0) or the second half of the paging frame (i_s=1). Note that if a SearchSpaceID≠0 is configured for pagingSearchSpace, then the wireless device may monitor an (i_s+1)th paging occasion.

In some implementations, a wireless device in an RRC idle or inactive state may be configured with a DRX cycle T (in frame) for paging monitoring. The wireless device may determine a paging frame from among T frames. Further, inside the paging frame, the wireless device may determine a paging occasion. Further, inside the paging occasion, there may be S consecutive PDCCH monitoring occasions, where each PDCCH monitoring occasion may correspond to one SSB. The wireless device may monitor all PDCCH monitoring occasions transmitted through different beam for monitoring paging message. Additionally, the wireless device may assume that the same paging message and short message are repeated in all transmitted beams (and/or all monitoring occasions).

In some implementations, the wireless device may monitor DCI1_0 with CRC scrambled with P-RNTI and, if detected, the wireless device may read a short message indicator field. Note that when the short message indicator indicates existence of paging message (e.g., either 01 or 11), the wireless device may decode an associated PDSCH. Additionally, when the wireless device finds its UE_ID in the pagingRecordList (carried by the PDSCH), then the wireless device may initiate (start) a RACH procedure to make an RRC (re)connection. Alternatively, the wireless device may stay in an RRC idle and/or inactive state.

However, these implementations of paging occasion determination mechanisms may lead to many wireless devices monitoring the same paging occasion. Additionally, many of these wireless devices may find no page indication (e.g., page associated with a particular UE-ID) after decoding the PDSCH (including paging message), thus wasting power. In other words, current mechanisms allow for a paging occasion to be assigned to multiple wireless devices and allow the UE-ID and N to determine the number of wireless devices monitoring the same paging occasion. Thus, all the wireless devices assigned to the same paging occasion monitor the same indicator (e.g., ShortMessageIndicator in DCI1_0) and, when the indicator indicates that there is scheduling information for paging, then, all the wireless devices monitoring the paging occasion may be required to perform decoding of corresponding PDSCH.

Embodiments described herein reduce the number of user equipment devices (UEs), such as UE 106, monitoring a paging occasion, thereby reducing a probability that a UE wastes its energy for unnecessary PDSCH decoding for paging. In some embodiments, a number of UEs monitoring a paging occasion may be reduced by adjusting various parameters. For example, increasing N, a number of paging frames, in a given DRX cycle T and/or increasing Ns, the number of paging occasions, in a paging frame. Note, however, that there may be a limitation in increasing N and Ns as both may be limited by T and frame length, respectively.

In some embodiments, a number of UEs monitoring a paging occasion may be reduced by including a group indication via an unused bit field in DCI1_0. In some embodiments, at least 6 bits may be available in a short message indicator field of DCI1_0. As noted above, current implementations of DCI1_0 with P-RNTI include a 2-bit shortmessageindicator field that may indicate whether PDSCH for paging and/or a short message is sent or not. For example, a short message indicator bit field value for 00 may be reserved, a short message indicator bit field value of 01 may indicate only scheduling information for paging is present in the DCI, a short message indicator bit field value of 10 may indicate only scheduling information for a short message is present in the DCI, and a short message indicator bit field value of 11 may indicate both scheduling information for paging and a short message are present in the DCI. Additionally, an 8-bit shortmessages field can be transmitted on the PDCCH using P-RNTI. In some instances, if only scheduling information for paging (e.g., PDSCH) is sent (e.g., shortmessageindicator value of 01), the shortmessages field may be reserved. However, if a short message is transmitted (e.g., shortmessageindicator value of 10 or 11), a first two bits are used to indicate system information modification and ETWS and CMAS indication, respectively and the remaining 6 may be reserved. Additionally, DCI1_0 may include an additional 6 bits that are reserved. In some embodiments, these reserved bits may be used to support larger number of groups of UEs (resulting in smaller group sizes). For example, when the shortmessages field are reserved, 8 bits of the DCI1_0 may be available to support a larger number of groups of UEs. In some embodiments, when the short message is transmitted, 6 bits of the short message may be available to support a larger number of groups of UEs. Further, in either of these embodiments, additional reserved bits (up to 6 bits) may be used to as well to support a larger number of groups. In other words, embodiments described herein may us available bits in the DCI1_0 (e.g., 6, 8, 12, and/or 14 bits depending on circumstances and/or conditions) to indicate paging indication for different groups of UEs. For example, when 8 bits are available for indicating groups of UEs, a value of 01000010 may indicate UE groups 1 and 6 have paging messages. Thus, UEs belonging to groups 1 and 6 may decode a corresponding PDSCH while UEs belonging to groups 0, 2, 3, 4, 5, and may not decode the PDSCH. For example, as illustrated by FIG. 11, a most significant bit (MSB) 1102a may indicate group 0 UEs, a bit 1102b may indicate group 1 UEs, a bit 1102c may indicate group 2 UEs, a bit 1102d may indicate group 3 UEs, and so forth up to the least significant bit (LSB) 1102x which may indicate group X UEs.

In some embodiments, a hashing method may be used to determine UE groups. For example, in some embodiments, a division hashing or a predefined arbitrary hashing function, g, may be implemented. In some embodiments, the division hashing may be a modulo operation performed on a UE-ID for a given devisor, K. For example, a hashing function may be $f(x)=x \bmod K$, where K is an integer between 6 and 14, among other values. In some embodiments, a hashing function $f(x)$ may map a set of UE-IDs to an integer set $\{0, 1, \ldots, K-1\}$, wherein an integer k in the integer set may correspond to UE group k. In some embodiments, an arbitrary hashing function $g(x)$ may map a set of UE_IDs to an integer set $\{0, 1, \ldots, K-1\}$.

In some embodiments, a bit position may be explicitly configured by the network for each UE. For example, when a set of UEs' traffic arrival is highly correlated, e.g., when there is very high chance (or probability) that many UEs (e.g., a majority of UEs) in a group of UEs will have incoming calls at the same time, those UEs may be grouped together. For example, in some embodiments, a first bit may be set for UEs receiving (or intended to receive) a first group cast G1 and a second bit may be set for UEs receiving (or intended to receive) a second group cast G2. Additionally, other UEs could be assigned to other bits according to specified criteria. As another example, a first bit may be associated with slicing #1 and a second bit may be associated slicing #2.

In some embodiments, legacy UEs (e.g., operating according to prior releases of 3GPP standards such as Release 15 and/or Release 16) may ignore the previously reserved bits of DCI1_0 and operate according to legacy (e.g., current implementations) paging procedures. Thus, there may be no impact on legacy UEs. In some embodiments, UEs supporting a group indication via the additional bits of DCI1_0 (e.g., as configured according to embodiments described herein), may avoid unnecessary PDSCH decoding with a higher probability. In some embodiments, a probability that a UE may avoid unnecessary PDSCH decoding for paging may depend on group size, e.g., smaller a group size, higher probability of avoiding unnecessary PDSCH decoding. Hence, if a group size is one (e.g., UE dedicated paging indication), then the probability that a UE can avoid unnecessary PDSCH decoding for paging is equal to 1.

In some embodiments, a number of UEs monitoring a paging occasion may be reduced by usage of a paging RNTI (PG-RNTI). In such embodiments, different paging groups may be supported via a PG RNTI for different groups of UEs monitoring a paging occasion, e.g., as illustrated by FIG. 12. As shown, at 1202, multiple UEs (e.g., UE1-UE24) may monitor paging occasion "x". However, as shown at 1204, 1206, and 1208, subsets of UEs may be associated with values of a PG-RNTI. Thus, UE1 through UE8 may monitor the paging occasion for a (or be configured with a) PG-RNTI value of 0xF001, UE9-UE16 may monitor the paging occasion for a (or be configured with a) PG-RNTI value of 0xF002, and UE17-UE24 may monitor the paging occasion for a (or be configured with a) PG-RNTI value of 0xF003. Additionally, at 1214, 1216, and 1218, when a particular PG-RNTI value is matched, the subset of UEs may detect the appropriate DCI.

Figure 13A:
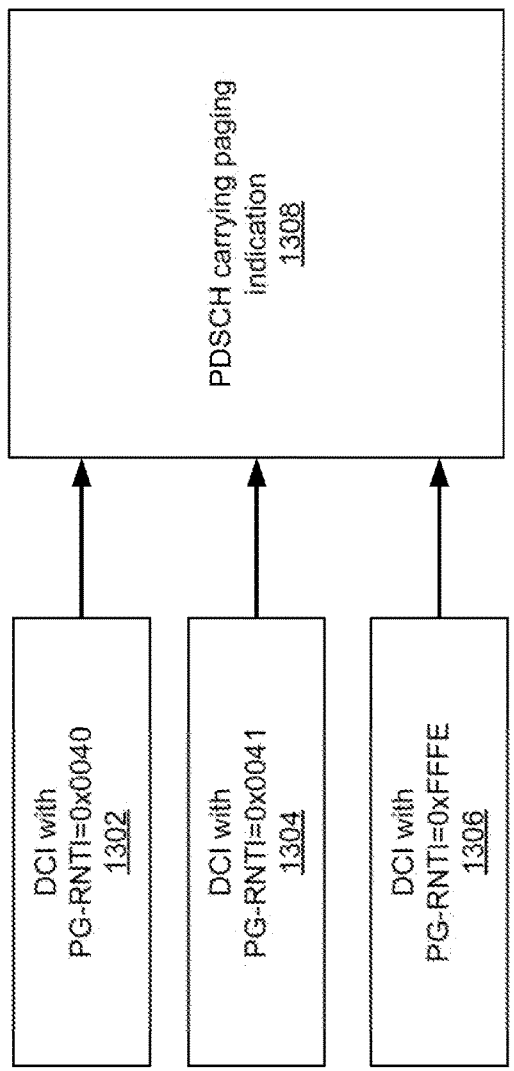
FIGS. 13A and 13B illustrate examples of PG-RNTI indicating PDSCH, according to some embodiments.
Figure 13B:
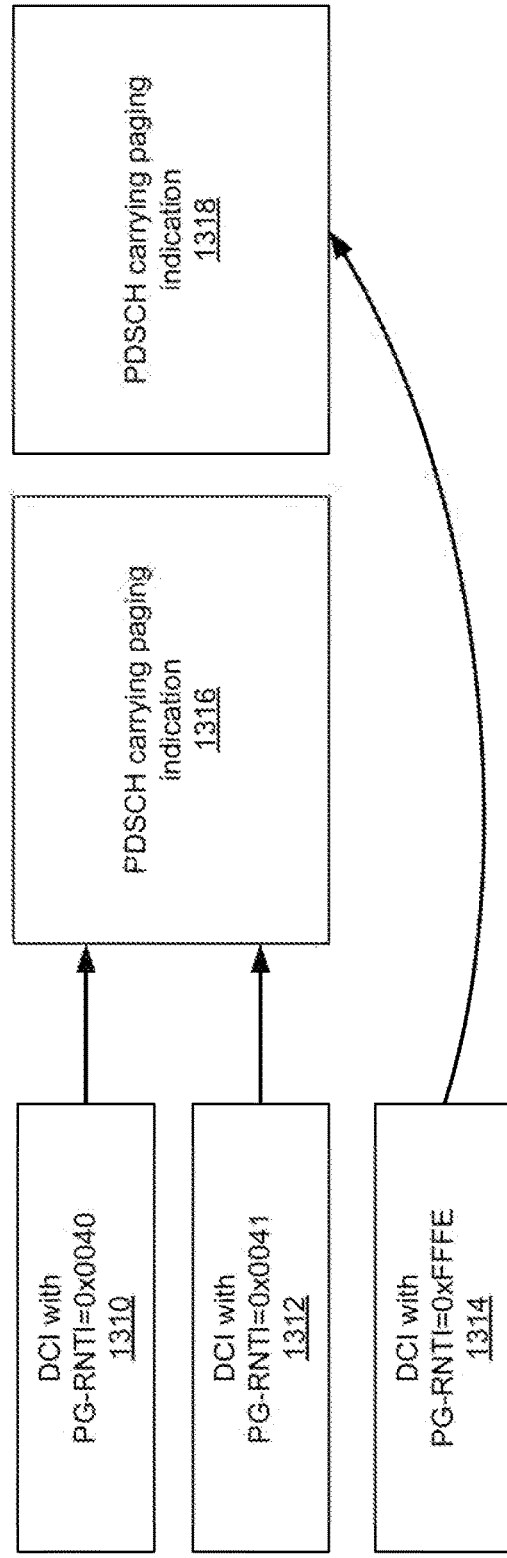

In some embodiments, a PG-RNTI value may not be fixed and may, instead, be a range of values. For example, in some embodiments, a PG-RNTI may have a range of values from 0x0001 to 0xFFEF. In addition, in some embodiments, a network may dynamically determine a number of paging indications/PDSCHs associated with a particular PG-RNTI value. In some embodiments, a PG-RNTI may be a group specific value, e.g., a set of UEs can be configured with the same value. In some embodiments two or more DCI1_0s with CRC scrambled with either PG-RNTIs or P-RNTI may indicate the same or different PDSCH. For example, as illustrated by FIG. 13A, a DCI with a PG-RNTI value of 0x0040 (e.g., 1302), a DCI with a PG-RNTI value of 0x0041 (e.g., 1304), and a DCI with a P-RNTI value of 0xFFFE (e.g., 1306) may indicate a PDSCH which carries a UE specific paging indication (e.g., 1308). As another example, as illustrated by FIG. 13B, a DCI with a PG-RNTI value of 0x0040 (e.g., 13010) and a DCI with a PG-RNTI value of 0x0041 (e.g., 1312) may indicate a first PDSCH which carries a UE specific paging indication (e.g., 1316), while a DCI with a P-RNTI value of 0xFFFE (e.g., 1314) may indicate a second PDSCH (e.g., 1318) carrying a paging indication.

In some embodiments, a number of UEs monitoring a paging occasion may be reduced by including a group indication via an unused bit field in DCI1_0 and usage of a PG-RNTI. In such embodiments, a first stage grouping may be based on PG-RNTI and a second stage grouping may be based on the unused bit field in DCI1_0. Thus, the first stage may specify a group of UEs and the second stage may specify a subset of the group of UEs. In some embodiments, if (when) Y is a number of PG-RNTIs configured for the UEs monitoring a particular paging opportunity and X is a number of bits in a DCI1_0 used to indicate groups, then a total number of UE groups which could be supported is given as Z=Y×X. For example, when 8 bits are used in a DCI1_0 to indicate groups and 3 PG-RNTIs are configured, then a total of 24 UE groups may be supported. As another example, when 6 bits are used in a DCI1_0 to indicate groups and 6 PG-RNTIs are configured, then a total of 36 UE groups may be supported. Note that these values are exemplary only, and other values are contemplated within the scope of the embodiments described herein.

In some embodiments, a PG-RNTI may be configured by a network. For example, in some embodiments, a network may configure one or more arbitrary PG-RNTIs that a UE is configured to monitor. Additionally, different UEs may or may not be assigned to a set of PG-RNTIs. Such an approach may allow the network significant flexibility in terms of UE grouping. Further, UEs do not need to know (and/or have knowledge) of grouping criteria applied.

In some embodiments, a rule-based determination may be applied to configured a UEs PG-RNTI(s). In some embodiments, a predefined association between a PG-RNTI and specific functionalities and/or reasons associated to (related to) paging may be implemented for a UE to determine PG-RNTI(s). For example, a UE may determine which PG-RNTI to monitor based on (1) a current UE state and/or operation and/or (2) a predefined association between a PC-RNTI and functionalities/reason for paging (e.g., based, at least in part, on CN/RAN based paging, slicing, multicast, broadcast, and so forth). Such an approach may allow the network less flexibility (e.g., as compared to the network configuring PG-RNTIs), however, in such an approach the network is not required to assign PG-RNTIs to UEs.

Figure 14:
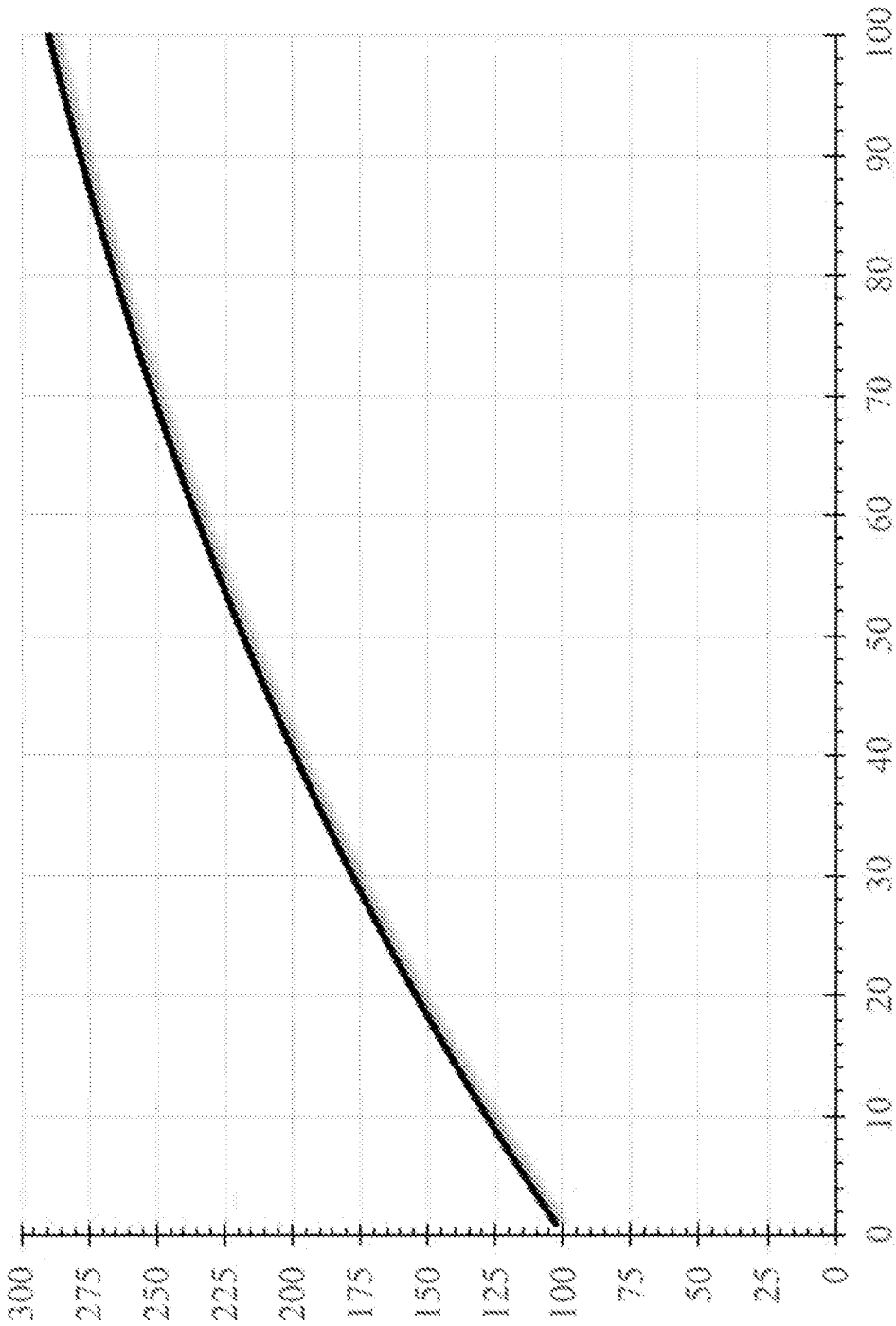
FIG. 14 illustrates an example of UE power consumption for blind decoding of PDCCH and decoding of PDSCH as a function of group size, according to some embodiments.

FIG. 14 illustrates an example of UE power consumption for blind decoding of PDCCH and decoding of PDSCH as a function of group size, according to some embodiments. As illustrated by FIG. 14, as a number of UEs in a group (e.g., group size) is reduced, power is consumption for decoding of PDSCH and PDCCH for paging for a slot may be reduced. In the example shown, a probability that a page is received by a UE is assumed to be 1%, power consumption for blind decoding of a PDCCH for paging for a slot is assumed to be 100, and power consumption for decoding a PDSCH for paging for a slot is assumed to be 300. Thus, energy consumption, E, can be expressed as a function of power consumption for blind decoding of a PDCCH, A, power consumption for decoding a PDSCH, B, and a probability, p, at least on page is received by the UE in a paging opportunity, e.g.:

$$E=A+Bp \qquad [1]$$

where p is a function of a number, N, of UEs in a group (group size) and a probability, q, that a page is received by a UE, e.g.:

$$p=1-(1-q)^N \qquad [2]$$

Hence, according to embodiments described herein, reduced group size leads to a reduction of energy consumption by a UE, such as UE 106, associated with paging procedures.

Figure 15:
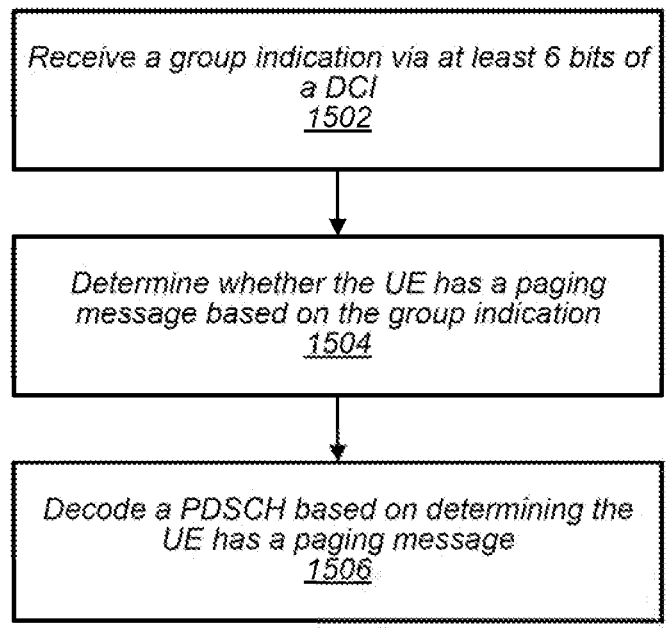
FIGS. 15, 16, and 17 illustrate block diagrams of examples of methods for group-based paging indications, according to some embodiments While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

FIG. 15 illustrates a block diagram of an example of a method for group-based paging indications, according to some embodiments. The method shown in FIG. 15 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1502, a UE, such as UE 106, may receive, from a network/base station/network node (e.g., such as base station 102), a group indication via at least six bits of a downlink control index (DCI). In some embodiments, each bit of the at least six bits may indicate a paging indication for a particular set of UEs.

At 1504, the UE may determine, based on the group indication, whether the UE has a paging message. In other words, the UE may determine whether there is as paging message intended for the UE based, at least in part, on the at least 6 bits included in the DCI. In some embodiments, the UE may determine whether there is a paging message intended for the UE base, at least in part, on determining whether a monitored bit of the at least 6 bits is set (e.g., has a value of '1'). In some embodiments, the monitored bit may be associated with a set of UEs associated with the UE. In some embodiments, the UE may be associated with more than one set of UEs. In such embodiments, the UE may monitor more than 1 bit of the at least 6 bits. In some embodiments, the determination may be based, at least in part, on a hashing function and/or an explicit bit configuration specified by the base station. In some embodiments, the hashing function may map a set of UE identifiers to a corresponding set of UEs. In some embodiments, the UE may be the UE is grouped with a set of UEs with correlated traffic arrival conditions.

At 1506, in response to determining that the UE has a paging message, the UE may decode a corresponding physical downlink shared channel (PDSCH), e.g., as indicated by the DCI. In some embodiments, the DCI may be a format DCI1_0 DCI with a cycle redundancy check (CRC) scrambled with a paging radio network temporary identifier, e.g., either a P-RNTI or a PG-RNTI.

In some embodiments, the UE may receive, from the base station, one or more paging radio network temporary identifiers (PG-RNTIs) and monitor a paging occasion based on values of the one or more PG-RNTIs. In some embodiments, each PG-RNTI may be for a set of UEs. In some embodiments, the particular set of UEs may a subset of at least one set of UEs associated with at least one of the one or more PG-RNTIs. In some embodiments, a PG-RNTI may have a value ranging between 0x0001 and 0xFFEF. In some embodiments, a value of a PG-RNTI may be associated with a particular PDSCH. In some embodiments, one or more values of a PG-RNTI may be associated with a particular PDSCH. In some embodiments, the one or more PC-RNTIs may be configured by the base station/network/network node. In some embodiments, the one or more PG-RNTIs may be determined based on one or more rules. In some embodiments, the one or more rules may be based, at least in part, on a current UE operational state and an association between a PG-RNTI and one or more functionalities or reasons associated with paging. In some embodiments, the one or more functionalities or reasons associated with paging may include whether paging is based on core network or radio access network paging, paging associated with slicing, paging associated with a multi-cast message, and/or paging associated with a broadcast message.

Figure 16:
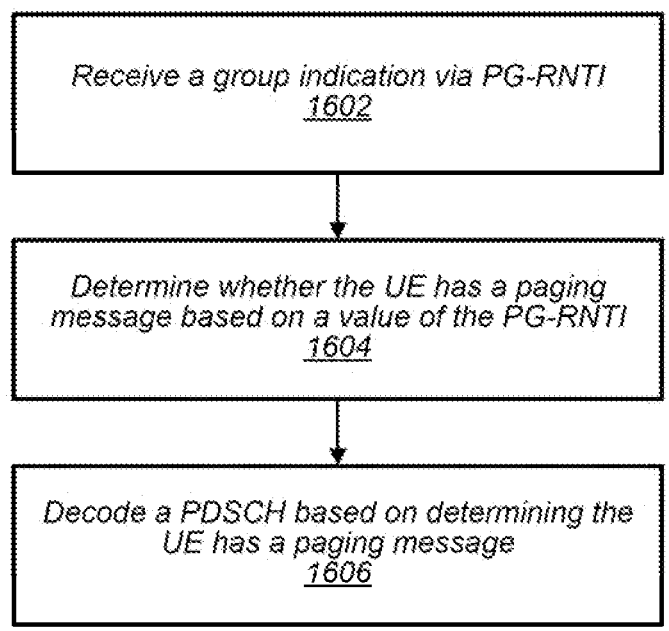

FIG. 16 illustrates a block diagram of another example of a method for group-based paging indications, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1602, a UE, such as UE 106, may receive, from a network/base station/network node (e.g., such as base station 102), a group indication via a paging radio network temporary identifier (PG-RNTI). In some embodiments, the UE may monitor a paging occasion based on values of the PG-RNTI. In some embodiments, each PG-RNTI may be for a set of UEs. In some embodiments, a PG-RNTI may have a value ranging between 0x0001 and 0xFFEF. In some embodiments, a value of a PG-RNTI may be associated with a particular PDSCH. In some embodiments, one or more values of a PG-RNTI may be associated with a particular PDSCH. In some embodiments, the PG-RNTI may be configured by the base station/network/network node. In some embodiments, the PG-RNTI may be determined based on one or more rules. In some embodiments, the one or more rules may be based, at least in part, on a current UE operational state and an association between a PG-RNTI and one or more functionalities or reasons associated with paging. In some embodiments, the one or more functionalities or reasons associated with paging may include whether paging is based on core network or radio access network paging, paging associated with slicing, paging associated with a multi-cast message, and/or paging associated with a broadcast message.

At 1604, the UE may determine, based on a value of the PG-RNTI, whether the UE has a paging message. In other words, the UE may determine whether there is a paging message intended for the UE based, at least in part, on a value of the PG-RNTI.

At 1606, in response to determining that the UE has a paging message, the UE may decode a corresponding physical downlink shared channel (PDSCH), e.g., as indicated by at least one value of the PG-RNTI. In some embodiments, a DCI may indicate the paging information. In such embodiments, the DCI may be a format DCI1_0 DCI with a cycle redundancy check (CRC) scrambled with the PG-RNTI.

In some embodiments, the group indication received via the PG-RNTI may indicate a paging occasion. In such embodiments, the UE may receive a paging indication via at least six bits of a downlink control index (DCI) received during the paging occasion. In some embodiments, each bit of the at least six bits may indicate a paging indication for a particular set of UEs. In some embodiments, the particular set of UEs may a subset of at least one set of UEs associated with at least one of the one or more PG-RNTIs. In some embodiments, the UE may determine whether there is a paging message intended for the UE based, at least in part, on the at least 6 bits included in the DCI. In some embodiments, the UE may determine whether there is a paging message intended for the UE base, at least in part, on determining whether a monitored bit of the at least 6 bits is set (e.g., has a value of '1'). In some embodiments, the monitored bit may be associated with a subset of UEs associated with the UE. In some embodiments, the UE may be associated with more than one set or subsets of UEs. In such embodiments, the UE may monitor more than 1 bit of the at least 6 bits. In some embodiments, the determination may be based, at least in part, on a hashing function and/or an explicit bit configuration specified by the base station/network/network node. In some embodiments, the hashing function may map a set of UE identifiers to a corresponding set of UEs. In some embodiments, the UE may be the UE is grouped with a set of UEs with correlated traffic arrival conditions.

Figure 17:
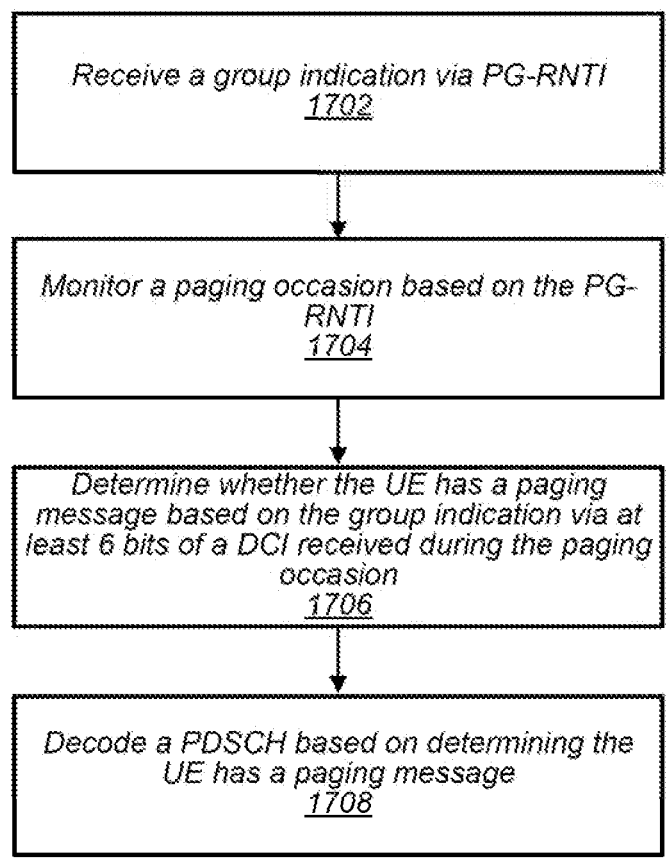

FIG. 17 illustrates a block diagram of yet another example of a method for group-based paging indications, according to some embodiments. The method shown in FIG. 17 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1702, a UE, such as UE 106, may receive, from a network/base station/network node (e.g., such as base station 102), a group indication via a paging radio network temporary identifier (PG-RNTI) (and/or one or more PG-RNTIs). In some embodiments, the group indication may be for a set of UEs.

At 1704, the UE may monitor a paging occasion based on a value of the PG-RNTI. In some embodiments, the network may configure values for a plurality of PG-RNTIs and each value (e.g., each PG-RNTI) may be for a set of UEs. In some embodiments, as PG-RNTI may have a value ranging between 0x0001 and 0xFFEF. In some embodiments, a value of a PG-RNTI may be associated with a particular PDSCH. In some embodiments, one or more values of a PG-RNTI may be associated with a particular PDSCH. In some embodiments, the PG-RNTI may be configured by the base station/network/network node. In some embodiments, the PG-RNTI may be determined based on one or more rules. In some embodiments, the one or more rules may be based, at least in part, on a current UE operational state and an association between a PG-RNTI and one or more functionalities or reasons associated with paging. In some embodiments, the one or more functionalities or reasons associated with paging may include whether paging is based on core network or radio access network paging, paging associated with slicing, paging associated with a multi-cast message, and/or paging associated with a broadcast message.

At 1706, the UE may determine whether there is a paging message intended for the UE based, at least in part, on at least 6 bits included in a DCI. In some embodiments, the UE may determine whether there is a paging message intended for the UE base, at least in part, on determining whether a monitored bit of the at least 6 bits is set (e.g., has a value of '1'). In some embodiments, the monitored bit may be associated with a set of UEs associated with the UE. In some embodiments, the UE may be associated with more than one set of UEs. In such embodiments, the UE may monitor more than 1 bit of the at least 6 bits. In some embodiments, the determination may be based, at least in part, on a hashing function and/or an explicit bit configuration specified by the base station. In some embodiments, the hashing function may map a set of UE identifiers to a corresponding set of UEs. In some embodiments, the UE may be grouped with a set of UEs with correlated traffic arrival conditions. In some embodiments, each bit of the at least six bits may indicate a paging indication for a particular set of UEs. In some embodiments, the particular set of UEs may a subset of at least one set of UEs associated with the value of the PG-RNTI.

At 1708, in response to determining that the UE has a paging message, the UE may decode a corresponding physical downlink shared channel (PDSCH), e.g., as indicated by at least one value of the PG-RNTI. In some embodiments, a DCI may indicate the paging information. In such embodiments, the DCI may be a format DCI1_0 DCI with a cycle redundancy check (CRC) scrambled with the PG-RNTI.

In some embodiments, the group indication received via the PG-RNTI may indicate a paging occasion. In such embodiments, the UE may receive a paging indication via at least six bits of a downlink control index (DCI) received during the paging occasion.

It is well understood that the use of personally identifiable information should follow privacy policies and practices tint are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system, Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include as processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
receiving, by a processor of a user equipment device (UE) from a base station of a network, a group indication via at least six bits of a downlink control information (DCI), wherein each bit of the at least six bits indicates a paging indication for a particular set of UEs associated with a respective group of a plurality of groups, wherein the UE is explicitly configured with a group of the plurality of groups by the network, and wherein the UE is grouped with a set of UEs with correlated traffic arrival conditions;
determining, based on the group indication, whether the UE has a paging message; and in response to determining that the UE has a paging message, decoding a corresponding physical downlink shared channel (PDSCH).

2. The method of claim 1, further comprising:
receiving, from the base station, one or more paging radio network temporary identifiers (PG-RNTIs), wherein each PG-RNTI is for a set of UEs, and wherein the particular set of UEs is a subset of at least one set of UEs associated with at least one of the one or more PG-RNTIs; and
monitoring a paging occasion based on a value of the PG-RNTI.

3. The method of claim 2,
wherein the PG-RNTI has a value ranging between 0x0001 and 0xFFEF.

4. The method of claim 2,
wherein a value of the PG-RNTI is associated with a particular PDSCH.

5. The method of claim 2,
wherein one or more values of the PG-RNTI are associated with a particular PDSCH.

6. The method of claim 2,
wherein the one or more PG-RNTIs are configured by the base station.

7. The method of claim 2,
wherein the one or more PG-RNTIs are determined based on one or more rules.

8. The method of claim 7,
wherein the one or more rules are based, at least in part, on a current UE operational state and an association between a PG-RNTI and one or more functionalities or reasons associated with paging.

9. The method of claim 8,
wherein the one or more functionalities or reasons associated with paging include whether paging is based on core network or radio access network paging, paging associated with slicing, paging associated with a multi-cast message, or paging associated with a broadcast message.

10. The method of claim 1,
wherein the DCI is a format 1_0 DCI with a cycle redundancy check (CRC) scrambled with a paging radio network temporary identifier (PG-RNTI).

11. The method of claim 1,
wherein the correlated traffic arrival conditions include a majority of UEs in the group of UEs having incoming calls.

12. An apparatus, comprising:
a memory; and
a processing element in communication with the memory, wherein the processing element is configured to:
receive, from a base station of a network, a group indication via a paging radio network temporary identifier (PG-RNTI), wherein a value of the PG-RNTI is associated with a paging occasion;
receive, from the base station of the network during the paging occasion, a paging indication via at least six bits of a downlink control information (DCI), wherein each bit of the at least six bits indicates a paging indication for a particular group of devices associated with a respective group of a plurality of groups, wherein the apparatus is explicitly configured with a group of the plurality of groups by the network, and wherein the apparatus is grouped with a set of devices with correlated traffic arrival conditions;
determine, based on the group indication, whether the apparatus has a paging message; and
in response to determining that the apparatus has a paging message, decode a corresponding physical downlink shared channel (PDSCH).

13. The apparatus of claim 12,
wherein the PG-RNTI has a value ranging between 0x0001 and 0xFFEF.

14. The apparatus of claim 12,
wherein a value of the PG-RNTI is associated with a particular PDSCH.

15. The apparatus of claim 12,
wherein one or more values of the PG-RNTI are associated with a particular PDSCH.

16. The apparatus of claim 12,
wherein the correlated traffic arrival conditions include a majority of UEs in the group of UEs having incoming calls.

17. A non-transitory computer readable memory medium storing program instructions executable by processing circuitry to cause a user equipment device (UE) to:
receive, from a base station of a network, an indication of a paging occasion via a paging radio network temporary identifier (PG-RNTI), wherein a value of the PG-RNTI is associated with the paging occasion;
monitor the paging occasion based on the value of the PG-RNTI;
receive, from the base station of the network during the paging occasion, a paging indication via at least six bits of a downlink control information (DCI), wherein each bit of the at least six bits indicates a paging indication for a particular set of UEs associated with a respective group of a plurality of groups, wherein the UE is explicitly configured with a group of the plurality of groups by the network, and wherein the UE is grouped with a set of UEs with correlated traffic arrival conditions; and
in response to determining that the UE has a paging message, decode a corresponding physical downlink shared channel (PDSCH).

18. The non-transitory computer readable memory medium of claim 17,
wherein the PG-RNTI is configured by the base station or determined based on one or more rules, wherein the one or more rules are based, at least in part, on a current UE operational state and an association between a PG-RNTI and one or more functionalities or reasons associated with paging, and wherein the one or more functionalities or reasons associated with paging include whether paging is based on core network or radio access network paging, paging associated with slicing, paging associated with a multi-cast message, or paging associated with a broadcast message.

19. The non-transitory computer readable memory medium of claim 17,
wherein the DCI is a format 1_0 DCI with a cycle redundancy check (CRC) scrambled with a paging radio network temporary identifier (PG-RNTI).

20. The non-transitory computer readable memory medium of claim 17,
wherein the correlated traffic arrival conditions include a majority of UEs in the group of UEs having incoming calls.

* * * * *